US012252670B2

(12) United States Patent
Backer et al.

(10) Patent No.: US 12,252,670 B2
(45) Date of Patent: Mar. 18, 2025

(54) METHOD OF CLEANING PLASTIC WITH DISPERSANT COPOLYMER

(71) Applicant: Rohm and Haas Company, Collegeville, PA (US)

(72) Inventors: Scott Backer, Phoenixville, PA (US); Paul Mercando, Pennsburg, PA (US)

(73) Assignee: Rohm and Haas Company, Collegeville, PA (US)

(*) Notice: Subject to any disclaimer, the term of this patent is extended or adjusted under 35 U.S.C. 154(b) by 721 days.

(21) Appl. No.: 17/056,613

(22) PCT Filed: Jun. 10, 2019

(86) PCT No.: PCT/US2019/036259
§ 371 (c)(1),
(2) Date: Nov. 18, 2020

(87) PCT Pub. No.: WO2020/005516
PCT Pub. Date: Jan. 2, 2020

(65) Prior Publication Data

US 2021/0207066 A1 Jul. 8, 2021

Related U.S. Application Data

(60) Provisional application No. 62/690,458, filed on Jun. 27, 2018.

(51) Int. Cl.

| | |
|---|---|
| ***C11D 1/66*** | (2006.01) |
| ***C11D 1/72*** | (2006.01) |
| ***C11D 3/04*** | (2006.01) |
| ***C11D 3/10*** | (2006.01) |
| ***C11D 3/20*** | (2006.01) |
| ***C11D 3/36*** | (2006.01) |
| ***C11D 3/37*** | (2006.01) |
| ***C11D 3/386*** | (2006.01) |
| ***C11D 17/00*** | (2006.01) |

(52) U.S. Cl.
CPC ................ *C11D 3/361* (2013.01); *C11D 1/66* (2013.01); *C11D 1/72* (2013.01); *C11D 3/046* (2013.01); *C11D 3/10* (2013.01); *C11D 3/2082* (2013.01); *C11D 3/2086* (2013.01); *C11D 3/3757* (2013.01); *C11D 3/3761* (2013.01); *C11D 3/3765* (2013.01); *C11D 3/386* (2013.01); *C11D 17/0008* (2013.01); *C11D 2111/18* (2024.01)

(58) Field of Classification Search
CPC .. C11D 1/66; C11D 3/10; C11D 3/046; C11D 3/361; C11D 3/3757; C11D 3/3761; C11D 3/3765; C11D 3/386
USPC ....... 510/223, 224, 226, 230, 469, 477, 505, 510/506, 509
See application file for complete search history.

(56) References Cited

U.S. PATENT DOCUMENTS

| | | | | |
|---|---|---|---|---|
| 5,409,629 A | 4/1995 | Shulman et al. | | |
| 2013/0150277 A1* | 6/2013 | Fischer | ................ | C11D 3/3769 510/230 |

FOREIGN PATENT DOCUMENTS

| | | | | |
|---|---|---|---|---|
| EP | 594332 | 4/1994 | | |
| EP | 0770673 | 5/1997 | | |
| EP | 2700704 A1 * | 2/2014 | ......... | C11D 11/0035 |
| EP | 2886634 A1 * | 6/2015 | ............... | C11D 1/66 |
| EP | 3228686 A1 * | 10/2017 | ......... | C11D 11/0023 |
| EP | 3228687 A1 * | 10/2017 | ......... | A47L 15/0007 |
| EP | 3257929 A1 * | 12/2017 | ........... | C11D 1/8255 |
| EP | 3286887 A1 * | 2/2018 | ........... | G06F 21/575 |
| EP | 3290503 A2 * | 3/2018 | ......... | A47L 15/0007 |
| WO | WO-9505440 A1 * | 2/1995 | ............... | C11D 1/75 |
| WO | WO-0172941 A1 * | 10/2001 | ......... | C11D 11/0023 |

(Continued)

OTHER PUBLICATIONS

"SIBILIA, ""A Guide to Materials Characterization and ChemicalAnalysis."" 1988, p. 81-84".

*Primary Examiner* — Gregory R Delcotto
(74) *Attorney, Agent, or Firm* — Thomas S. Deibert

(57) ABSTRACT

A method of cleaning a plastic article in an automatic dishwashing machine is provided, comprising: selecting an automatic dishwashing composition for cleaning plastic, wherein the automatic dishwashing composition, comprises: a builder; a phosphonate; a nonionic surfactant; and a dispersant polymer comprising: (a) 60 to <90 wt % of structural units of formula I

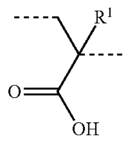

I wherein each $R^1$ is independently selected from a hydrogen and a $-CH_3$ group; and (b) >10 to 40 wt % of structural units of formula II

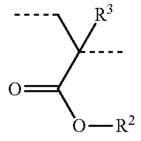

II wherein each $R^2$ is independently selected from a $-C_{2-3}$ alkyl group and wherein each $R^3$ is independently selected from a hydrogen and a methyl group.

5 Claims, No Drawings

(56) References Cited

FOREIGN PATENT DOCUMENTS

| | | | | |
|---|---|---|---|---|
| WO | WO-2014099237 A1 * | 6/2014 | ............... | C11D 3/33 |
| WO | WO-2016057391 A1 * | 4/2016 | ............... | C11D 3/00 |

* cited by examiner

METHOD OF CLEANING PLASTIC WITH DISPERSANT COPOLYMER

The present invention relates to a method of cleaning plastic. In particular, the present invention relates to a method of cleaning plastic using automatic dishwashing composition selected to incorporate a dispersant polymer having reduced filming properties on plastic.

Automatic dishwashing compositions are generally recognized as a class of detergent compositions distinct from those used for fabric washing or water treatment. Automatic dishwashing compositions are expected by users to produce a spotless and film-free appearance on washed articles after a complete cleaning cycle.

Phosphate-free automatic dishwashing compositions are increasingly desirable. Phosphate-free automatic dishwashing compositions typically rely on non-phosphate builders, such as salts of citrate, carbonate, silicate, disilicate, bicarbonate, aminocarboxylates and others to sequester calcium and magnesium from hard water, and upon drying, leave an insoluble visible deposit.

Currently available polymers employed in phosphate-free automatic dishwashing compositions to combat the formation of undesirable deposits on glassware include polyacrylic acid polymers and copolymers of acrylic acid and 2-acrylamido-2-methylpropane sulfonic acid (AMPS) and sodium styrene sulfonate (SSS). Polyacrylic acid polymers, however, fail to prevent certain film deposits on glassware (e.g., magnesium disilicate and calcium phosphonate scales), which present as transparent blue to blue/white films on glassware and brown films on stainless steel. Copolymers of acrylic acid with sulfonated monomers, while excellent at silicate and phosphonate scale prevention, such copolymers are not particularly effective at carbonate scale prevention. In addition, such polymers tend to have a negative impact on spotting, requiring the use of strong chelants or specialized surfactants, which lead to undesirable increases in the overall cost of the dishwashing composition.

Accordingly there remains a need for new dispersant polymers for use in automatic dish washing formulations. In particular, there remains a need for new dispersant polymers for use in automatic dish washing formulations selected for use on plastic articles, wherein the dispersant polymers provide good filming performance when incorporated into phosphate-free formulations.

The present invention provides a method of cleaning a plastic article in an automatic dishwashing machine, comprising: selecting an automatic dishwashing composition for cleaning plastic, wherein the automatic dishwashing composition, comprises: a builder; a phosphonate; a nonionic surfactant; and a dispersant polymer comprising: (a) 60 to <90 wt % of structural units of formula I

I

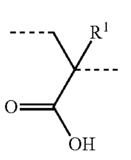

wherein each $R^1$ is independently selected from a hydrogen and a —$CH_3$ group; and (b) >10 to 40 wt % of structural units of formula II

II

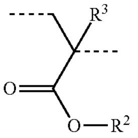

wherein each $R^2$ is independently selected from a —$C_{2-3}$ alkyl group and wherein each $R^3$ is independently selected from a hydrogen and a methyl group.

The present invention provides a method of cleaning a plastic article in an automatic dishwashing machine, comprising: (A) selecting an automatic dishwashing composition for cleaning plastic, wherein the automatic dishwashing composition, comprises: a builder; a phosphonate; a nonionic surfactant; and a dispersant polymer comprising: (a) 60 to <90 wt % of structural units of formula I, wherein each $R^1$ is independently selected from a hydrogen and a —$CH_3$ group; and (b) >10 to 40 wt % of structural units of formula II, wherein each $R^2$ is independently selected from a —$C_{2-3}$ alkyl group and wherein each $R^3$ is independently selected from a hydrogen and a methyl group; (B) providing a plastic article; and, (C) applying the automatic dishwashing composition to the plastic article.

The present invention provides a method of cleaning a plastic article in an automatic dishwashing machine, comprising: (A) selecting an automatic dishwashing composition for cleaning plastic, wherein the automatic dishwashing composition, comprises: 50 to 85 wt % of a builder, wherein the builder is selected from the group consisting of carbonates, bicarbonates, citrates, silicates and mixtures thereof; 0.75 to 7 wt % of a phosphonate; 1.5 to 7.5 wt % of a nonionic surfactant; and 2 to 6 wt % of a dispersant polymer; wherein the dispersant polymer comprises: a dispersant polymer comprising: (a) 75 to 85 wt % of structural units of formula I, wherein $R^0$ is a hydrogen in at least 98 mol % of the structural units of formula I; and (b) 15 to 25 wt % of structural units of formula II, wherein $R^2$ is an ethyl group in at least 98 mol % of the structural units of formula II and wherein $R^3$ is a hydrogen in at least 98 mol % of the structural units of formula II; and wherein the dispersant polymer has a weight average molecular weight, $M_W$, of 1,750 to 17,500 Daltons; (B) providing a plastic article; and, (C) applying the automatic dishwashing composition to the plastic article.

DETAILED DESCRIPTION

Surprisingly, it has been found that, the selection of an automatic dishwashing composition comprising a dispersant polymer of the present invention (particularly phosphate-free automatic dishwashing compositions), provide surprisingly good anti-filming performance on plastic articles versus automatic dishwashing compositions comprising conventional dispersant polymers.

Unless otherwise indicated, ratios, percentages, parts, and the like are by weight. Weight percentages (or wt %) in the composition are percentages of dry weight, i.e., excluding any water that may be present in the composition. Percentages of monomer units in the polymer are percentages of solids weight, i.e., excluding any water present in a polymer emulsion.

As used herein, unless otherwise indicated, the terms "weight average molecular weight" and "Mw" are used interchangeably to refer to the weight average molecular weight as measured in a conventional manner with gel permeation chromatography (GPC) and conventional standards, such as polystyrene standards. GPC techniques are discussed in detail in Modem Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Weight average molecular weights are reported herein in units of Daltons.

The term “phosphate-free” as used herein and in the appended claims means compositions containing ≤1 wt % (preferably, ≤0.5 wt %; more preferably, ≤0.2 wt %; still more preferably, ≤0.01 wt %; yet still more preferably, ≤0.001 wt %; most preferably, less than the detectable limit) of phosphate (measured as elemental phosphorus).

The term “structural units” as used herein and in the appended claims refers to the remnant of the indicated monomer; thus a structural unit of (meth)acrylic acid is illustrated:

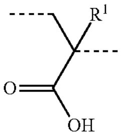

wherein the dotted lines represent the points of attachment to the polymer backbone and where $R^1$ is a hydrogen for structural units of acrylic acid and a $—CH_3$ group for structural units of methacrylic acid.

Preferably, the method of cleaning a plastic article in an automatic dishwashing machine of the present invention, comprises: selecting an automatic dishwashing composition for cleaning plastic, wherein the automatic dishwashing composition, comprises: a builder (preferably, 1 to 97 wt % (more preferably, ≥10 wt %; yet more preferably, ≥20 wt %; still more preferably, ≥25 wt %; most preferably, ≥50 wt %; preferably, ≤95 wt %; more preferably, ≤90 wt %; still more preferably, ≤85 wt %; most preferably, ≤80 wt %), based on the dry weight of the automatic dishwashing composition, of the builder)(preferably, wherein the builder includes a mixture of at least one carbonate and at least one citrate); a phosphonate (preferably, 0.1 to 15 wt % (more preferably, 0.5 to 10 wt %; still more preferably, 0.75 to 7 wt %; most preferably, 0.9 to 5 wt %), based on the dry weight of the automatic dishwashing composition, of the phosphonate) (preferably, wherein the phosphonate has a weight average molecular weight of ≤1,000 Daltons); a nonionic surfactant (preferably, 0.2 to 15 wt % (more preferably, 0.5 to 10 wt %; most preferably, 1.5 to 7.5 wt %), based on the dry weight of the automatic dishwashing composition, of the nonionic surfactant)(preferably, wherein the nonionic surfactant is a fatty alcohol alkoxylate); and a dispersant polymer (preferably, 0.5 to 15 wt % (more preferably, 0.5 to 10 wt %; still more preferably, 1 to 8 wt %; most preferably, 2 to 6 wt %), based on the dry weight of the automatic dishwashing composition, of the dispersant polymer) comprising: (a) 60 to <90 wt % (preferably, 70 to 85 wt %; more preferably, 75 to 82 wt %; most preferably, 75 to 81 wt %) of structural units of formula I

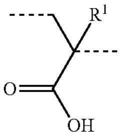
I wherein each $R^1$ is independently selected from a hydrogen and a $—CH_3$ group; and (b) >10 to 40 wt % (preferably, 15 to 30 wt %; more preferably, 18 to 25 wt %; most preferably, 19 to 25 wt %) of structural units of formula II

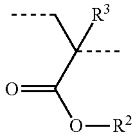
II wherein each $R^2$ is independently selected from a $—C_{2-3}$ alkyl group (preferably, an ethyl group) and wherein each $R^3$ is independently selected from a hydrogen and a methyl group.

Preferably, the method of cleaning a plastic article in an automatic dishwashing machine of the present invention, further comprises: providing a plastic article (e.g., plastic cookware, plastic bakeware, plastic tableware, plastic dishware, plastic flatware and plastic tumblers); and, applying the automatic dishwashing composition to the plastic article. More preferably, the plastic article includes a plurality of plastic articles. Still more preferably, the plastic article includes a plastic tumbler. Most preferably, the plastic article includes a polystyrene tumbler.

Preferably, the method of cleaning a plastic article in an automatic dishwashing machine of the present invention, comprises: (A) selecting an automatic dishwashing composition, wherein the automatic dishwashing composition, comprises: 50 to 85 wt % of the builder, wherein the builder is selected from the group consisting of carbonates, bicarbonates, citrates, silicates and mixtures thereof; 0.75 to 7 wt % of the phosphonate; 1.5 to 7.5 wt % of the nonionic surfactant; and 2 to 6 wt % of the dispersant polymer; wherein the dispersant polymer comprises: (a) 75 to 85 wt % of structural units of formula I, wherein $R^1$ is a hydrogen in at least 98 mol % of the structural units of formula I; and (b) 15 to 25 wt % of structural units of formula II, wherein $R^2$ is an ethyl group in at least 98 mol % of the structural units of formula II and wherein $R^3$ is a hydrogen in at least 98 mol % of the structural units of formula II; and wherein the dispersant polymer has a weight average molecular weight, $M_W$, of 1,750 to 17,500 Daltons; (B) providing a plastic article; and (C) applying the automatic dishwashing composition to the plastic article (preferably, in an automatic dishwasher); wherein the formation of film on the plastic article is inhibited.

Preferably, in the method of cleaning a plastic article in an automatic dishwashing machine of the present invention, the automatic dishwashing composition selected, comprises a builder. Preferably, in the method of cleaning a plastic article in an automatic dishwashing machine of the present invention, the automatic dishwashing composition selected, comprises a builder, wherein the builder comprises a mixture of at least one carbonate and at least one citrate. More preferably, in the method of cleaning a plastic article in an automatic dishwashing machine of the present invention, the automatic dishwashing composition selected, comprises a builder, wherein the builder comprises a mixture of at least one carbonate, at least one citrate and at least one citrate. Still more preferably, in the method of cleaning a plastic article in an automatic dishwashing machine of the present invention, the automatic dishwashing composition selected, comprises: a builder, wherein the builder comprises a mixture of sodium carbonate, sodium percarbonate and sodium citrate. Most preferably, in the method of cleaning a plastic article in an automatic dishwashing machine of the present invention, the automatic dishwashing composition selected, comprises: a builder, wherein the builder comprises a mixture of sodium carbonate, sodium percarbonate, sodium silicate and sodium citrate.

Preferably, in the method of cleaning a plastic article in an automatic dishwashing machine of the present invention, the automatic dishwashing composition selected, comprises: 1 to 97 wt %, based on the dry weight of the automatic dishwashing composition, of a builder. Preferably, in the method of cleaning a plastic article in an automatic dishwashing machine of the present invention, the automatic dishwashing composition selected, comprises: ≥1 wt % (preferably, ≥10 wt %; more preferably, ≥20 wt %; yet more preferably, ≥25 wt %; most preferably, ≥50 wt %), based on the dry weight of the automatic dishwashing composition, of the builder. Preferably, in the method of cleaning a plastic article in an automatic dishwashing machine of the present invention, the automatic dishwashing composition selected, comprises: ≤95 wt % (preferably, ≤90 wt %; more preferably, ≤85 wt %; most preferably, ≤80 wt %), based on the dry weight of the automatic dishwashing composition, of the builder. Weight percentages of carbonate, citrate and silicate builders are based on the actual weights of the salts, including metal ions.

The term "carbonate(s)" as used herein and in the appended claims refers to alkali metal or ammonium salts of carbonate, bicarbonate, percarbonate, and/or sesquicarbonate. Preferably, the carbonate used in the selected automatic dishwashing composition (if any) is selected from the group consisting of carbonate salts of sodium, potassium and lithium (more preferably, salts of sodium or potassium; most preferably, salts of sodium). Percarbonate used in the selected automatic dishwashing composition (if any) is selected from salts of sodium, potassium, lithium and ammonium (more preferably, salts of sodium or potassium; most preferably, salts of sodium). Most preferably, the carbonate used in the selected automatic dishwashing composition (if any) includes at least one of sodium carbonate, sodium bicarbonate and sodium percarbonate. Preferably, when the builder used in the selected automatic dishwashing composition of the present invention includes carbonate, the automatic dishwashing composition preferably, comprises 0 to 97 wt % (preferably, 10 to 75 wt %; more preferably, 25 to 60 wt %; most preferably 40 to 50 wt %), based on the dry weight of the automatic dishwashing composition, of carbonate.

The term "citrate(s)" as used herein and in the appended claims refers to alkali metal citrates. Preferably, the citrate used in the selected automatic dishwashing composition (if any) is selected from the group consisting of citrate salts of sodium, potassium and lithium (more preferably, salts of sodium or potassium; most preferably, salts of sodium). More preferably, the citrate used in the selected automatic dishwashing composition (if any) is sodium citrate. Preferably, when the builder used in the selected automatic dishwashing composition of the present invention includes citrate, the selected automatic dishwashing composition preferably, comprises 0 to 97 wt % (preferably, 5 to 75 wt %; more preferably, 10 to 60 wt %; most preferably 20 to 40 wt %), based on the dry weight of the automatic dishwashing composition, of the citrate.

The term "silicate(s)" as used herein and in the appended claims refers to alkali metal silicates. Preferably, the silicate used in the selected automatic dishwashing composition (if any) is selected from the group consisting of silicate salts of sodium, potassium and lithium (more preferably, salts of sodium or potassium; most preferably, salts of sodium). More preferably, the silicate used in the selected automatic dishwashing composition (if any) is sodium disilicate. Preferably, the builder used in the selected automatic dishwashing composition of the present invention includes a silicate. Preferably, when the builder used in the selected automatic dishwashing composition of the present invention includes a silicate, the selected automatic dishwashing composition preferably, comprises 0 to 97 wt % (preferably, 0.1 to 10 wt %; more preferably, 0.5 to 7.5 wt %; most preferably 0.75 to 3 wt %), based on the dry weight of the automatic dishwashing composition, of the silicate.

Preferably, in the method of cleaning a plastic article in an automatic dishwashing machine of the present invention, the automatic dishwashing composition selected, comprises 0.1 to 15 wt % (more preferably, 0.5 to 10 wt %; still more preferably, 0.75 to 7 wt %; most preferably, 0.9 to 5 wt %), based on the dry weight of the automatic dishwashing composition, of a phosphonate. More preferably, in the method of cleaning a plastic article in an automatic dishwashing machine of the present invention, the automatic dishwashing composition selected, comprises 0.1 to 15 wt % (more preferably, 0.5 to 10 wt %; still more preferably, 0.75 to 7 wt %; most preferably, 0.9 to 5 wt %), based on the dry weight of the automatic dishwashing composition, of a phosphonate; wherein the phosphonate is a low molecular weight having a weight average molecular weight of ≤1,000 Daltons. Still more preferably, in the method of cleaning a plastic article in an automatic dishwashing machine of the present invention, the automatic dishwashing composition selected, comprises 0.1 to 15 wt % (more preferably, 0.5 to 10 wt %; still more preferably, 0.75 to 7 wt %; most preferably, 0.9 to 5 wt %), based on the dry weight of the automatic dishwashing composition, of a phosphonate; wherein the phosphonate comprises at least one of 1-hydroxyethylidene-1,1-diphosphonic acid (HEDP) and a salt of 1-hydroxyethylidene-1,1-diphosphonic acid. Most preferably, in the method of cleaning a plastic article in an automatic dishwashing machine of the present invention, the automatic dishwashing composition selected, comprises 0.1 to 15 wt % (more preferably, 0.5 to 10 wt %; still more preferably, 0.75 to 7 wt %; most preferably, 0.9 to 5 wt %), based on the dry weight of the automatic dishwashing composition, of a phosphonate; wherein the phosphonate is selected from the group consisting of 1-hydroxyethylidene-1,1-diphosphonic acid (HEDP) and salts thereof.

Preferably, in the method of cleaning a plastic article in an automatic dishwashing machine of the present invention, the automatic dishwashing composition selected, comprises: 0.2 to 15 wt % (preferably, 0.5 to 10 wt %; more preferably, 1.5 to 7.5 wt %), based on the dry weight of the automatic dishwashing composition, of a nonionic surfactant. More preferably, in the method of cleaning a plastic article in an automatic dishwashing machine of the present invention, the automatic dishwashing composition selected, comprises: 0.2 to 15 wt % (preferably, 0.5 to 10 wt %; more preferably, 1.5 to 7.5 wt %), based on the dry weight of the automatic dishwashing composition, of the nonionic surfactant; wherein the surfactant comprises a fatty alcohol alkoxylate. Most preferably, in the method of cleaning a plastic article in an automatic dishwashing machine of the present invention, the automatic dishwashing composition selected, comprises: 0.2 to 15 wt % (preferably, 0.5 to 10 wt %; more preferably, 1.5 to 7.5 wt %), based on the dry weight of the automatic dishwashing composition, of the nonionic surfactant; wherein the surfactant is a fatty alcohol alkoxylate.

Preferably, the nonionic surfactant used in the selected automatic dishwashing composition of the present invention has a formula selected from $RO-(M)_x-(N)_y$—OH, and $RO-(M)_x-(N)_y-(P)_z$-OH wherein M represents structural units of ethylene oxide, N represents structural units of $C_{3-18}$1,2-epoxyalkane, P represents structural units of $C_{6-18}$ alkyl glycidyl ether, x is 5 to 40, y is 0 to 20, z is 0 to 3 and R represents a $C_{6-22}$ linear or branched alkyl group.

Preferably, the nonionic surfactant used in the selected automatic dishwashing composition of the present invention has a formula selected from $RO-(M)_x-(N)_y$—OH, and $RO-(M)_x-(N)_y$—O—R' wherein M and N are structural units derived from alkylene oxides (of which one is ethylene oxide); x is 5 to 40; y is 0 to 20; R represents a $C_{6-22}$ linear or branched alkyl group; and R' represents a group derived from the reaction of an alcohol precursor with a $C_{6-22}$ linear or branched alkyl halide, epoxyalkane or glycidyl ether.

Preferably, the nonionic surfactant used in the selected automatic dishwashing composition of the present invention has a formula $RO-(M)_x$-OH wherein M represents structural units of ethylene oxide and x is at least three (preferably, at least five; preferably, no more than ten; more preferably, no more than eight). Preferably, wherein R and R' each have at least eight (more preferably, at least ten) carbon atoms.

Preferably, in the method of cleaning a plastic article in an automatic dishwashing machine of the present invention, the automatic dishwashing composition selected, includes a dispersant polymer. More preferably, in the method of cleaning a plastic article in an automatic dishwashing machine of the present invention, the automatic dishwashing composition selected, includes: 0.5 to 15 wt %, based on the dry weight of the automatic dishwashing composition, of a dispersant polymer. Still more preferably, in the method of cleaning a plastic article in an automatic dishwashing machine of the present invention, the automatic dishwashing composition selected, includes 0.5 to 10 wt %, based on the dry weight of the automatic dishwashing composition, of a dispersant polymer. Yet more preferably, in the method of cleaning a plastic article in an automatic dishwashing machine of the present invention, the automatic dishwashing composition selected, includes 1 to 8 wt %, based on the dry weight of the automatic dishwashing composition, of a dispersant polymer. Most preferably, in the method of cleaning a plastic article in an automatic dishwashing machine of the present invention, the automatic dishwashing composition selected, includes 2 to 6 wt %, based on the dry weight of the automatic dishwashing composition, of a dispersant polymer.

Preferably, the dispersant polymer used in the selected automatic dishwashing composition of the present invention comprises 60 to <90 wt % (preferably, 70 to 85 wt %; more preferably, 75 to 82 wt %; most preferably, 75 to 81 wt %), based on weight of the dispersant polymer, of structural units of formula I

I

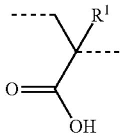

wherein each $R^1$ is independently selected from a hydrogen and a —$CH_3$ group. More preferably, the dispersant polymer used in the selected automatic dishwashing composition of the present invention comprises 60 to <90 wt % (preferably, 70 to 85 wt %; more preferably, 75 to 82 wt %; most preferably, 75 to 81 wt %), based on weight of the dispersant polymer, of structural units of formula I; wherein $R^1$ is a hydrogen in 75 to 100 mol % (preferably, 90 to 100 mol %; more preferably, 98 to 100 mol %; still more preferably, ≥99 mol %; most preferably, 100 mol %) of the structural units of formula I in the dispersant polymer.

Preferably, the dispersant polymer used in the selected automatic dishwashing composition of the present invention comprises >10 to 40 wt % (preferably, 15 to 30 wt %; more preferably, 18 to 25 wt %; most preferably, 19 to 25 wt %), based on weight of the dispersant polymer, of structural units of formula II

II

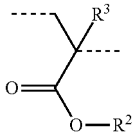

wherein each $R^2$ is independently selected from a —$C_{2-3}$ alkyl group (preferably, an ethyl group) and wherein each $R^3$ is independently selected from a hydrogen and a methyl group. More preferably, the dispersant polymer used in the selected automatic dishwashing composition of the present invention comprises >10 to 40 wt % (preferably, 15 to 30 wt %; more preferably, 18 to 25 wt %; most preferably, 19 to 25 wt %), based on weight of the dispersant polymer, of structural units of formula II

II

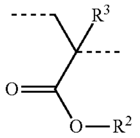

wherein each $R^2$ is an ethyl group and wherein each $R^3$ is independently selected from a hydrogen and a methyl group. Most preferably, the dispersant polymer used in the selected automatic dishwashing composition of the present invention comprises >10 to 40 wt % (preferably, 15 to 30 wt %; more preferably, 18 to 25 wt %; most preferably, 19 to 25 wt %), based on weight of the dispersant polymer, of structural units of formula II, wherein $R^2$ is an ethyl group in 75 to 100 mol % (preferably, 90 to 100 mol %; more preferably, 98 to 100 mol %; most preferably, 100 mol %) of the structural units of formula II in the dispersant polymer; and wherein $R^3$ is a hydrogen in 75 to 100 mol % (preferably, 90 to 100 mol %; more preferably, 98 to 100 mol %; most preferably, 100 mol %) of the structural units of formula II in the dispersant polymer.

Preferably, the dispersant polymer used in the selected automatic dishwashing composition of the present invention has a weight average molecular weight of 1,200 to 25,000 Daltons. More preferably, the dispersant polymer used in the selected automatic dishwashing composition of the present invention has a weight average molecular weight of 1,500 to 20,000 Daltons. Still more preferably, the dispersant polymer used in the selected automatic dishwashing composition of the present invention has a weight average molecular weight of 1,750 to 17,500 Daltons. Most preferably, the dispersant polymer used in the selected automatic dishwashing composition of the present invention has a weight average molecular weight of 1,900 to 14,250 Daltons.

Preferably, the dispersant polymer used in the selected automatic dishwashing composition of the present invention comprises ≤0.3 wt % (more preferably, ≤0.1 wt %; still more preferably, ≤0.05 wt %; yet still more preferably, ≤0.03 wt %; most preferably, ≤0.01 wt %) of structural units of multi-ethylenically unsaturated crosslinking monomer.

Preferably, the dispersant polymer used in the selected automatic dishwashing composition of the present invention comprises ≤1 wt % (preferably, ≤0.5 wt %; more preferably, ≤0.001 wt %; still more preferably, ≤0.0001 wt %; most preferably, <the detectable limit) of structural units of sulfonated monomer. More preferably, the dispersant polymer used in the automatic dishwashing composition of the present invention comprises ≤1 wt % (preferably, ≤0.5 wt %; more preferably, ≤0.001 wt %; still more preferably, ≤0.0001 wt %; most preferably, <the detectable limit) of structural units of sulfonated monomer selected from the group consisting of 2-acrylamido-2-methylpropane sulfonic acid (AMPS), 2-methacrylamido-2-methylpropane sulfonic acid, 4-styrenesulfonic acid, vinylsulfonic acid, 3-allyloxy sulfonic acid, 2-hydroxy-1-propane sulfonic acid (HAPS), 2-sulfoethyl(meth)acrylic acid, 2-sulfopropyl(meth)acrylic acid, 3-sulfopropyl(meth)acrylic acid, 4-sulfobutyl(meth)acrylic acid and salts thereof. Most preferably, the dispersant polymer used in the selected automatic dishwashing composition of the present invention comprises ≤1 wt % (preferably, ≤0.5 wt %; more preferably, ≤0.001 wt %; still more preferably, ≤0.0001 wt %; most preferably, <the detectable limit) of structural units of 2-acrylamido-2-methylpropane sulfonic acid (AMPS) monomer.

Methods of making the dispersant copolymers used in the selected automatic dishwashing composition of the present invention are well known to persons skilled in the art of copolymerization.

The selected automatic dishwashing composition of the present invention, optionally further comprises an additive. Preferably, the selected automatic dishwashing composition of the present invention, further comprises an additive selected from the group consisting of an alkaline source; a bleaching agent (e.g., sodium percarbonate, sodium perborate); a bleach activator (e.g., tetraacetylethylenediamine (TAED)); a bleach catalyst (e.g., manganese(II) acetate, cobalt(II) chloride, bis(TACN)magnesium trioxide diacetate); an enzyme (e.g., protease, amylase, lipase, or cellulase); a foam suppressant; a coloring agent; a fragrance; an additional builder; an antibacterial agent; a filler; a deposit control polymer and mixtures thereof. More preferably, the selected automatic dishwashing composition of the present invention, further comprises an additive, wherein the additive is selected from the group consisting of a bleaching agent, a bleach activator, an enzyme, a filler and mixtures thereof. Still more preferably, the selected automatic dishwashing composition of the present invention, further comprises an additive, wherein the additive includes a bleaching agent (e.g., sodium percarbonate, sodium perborate); a bleach activator (e.g., tetraacetylethylenediamine (TAED)) and an enzyme (e.g., protease, amylase, lipase, or cellulase). Most preferably, the selected automatic dishwashing composition of the present invention, further comprises an additive, wherein the additive includes a bleaching agent, wherein the bleaching agent includes sodium percarbonate; a bleach activator, wherein the bleach activator includes tetraacetylethylenediamine (TAED); and an enzyme, wherein the enzyme includes a protease and an amylase.

Fillers included in tablets or powders are inert, water-soluble substances, typically sodium or potassium salts (e.g., sodium sulfate, potassium sulfate, sodium chloride, potassium cloride). In tablets and powders, fillers are typically present in amounts ranging from 0 wt % to 75 wt %. Fillers included in gel formulations typically include those mentioned for use in tablets and powders and also water. Fragrances, dyes, foam suppressants, enzymes and antibacterial agents usually total no more than 10 wt %, alternatively no more than 5 wt %, of the selected automatic dishwashing composition.

The selected automatic dishwashing composition of the present invention, optionally further comprises: an alkaline source. Suitable alkaline sources include, without limitation, alkali metal carbonates and alkali metal hydroxides, such as sodium or potassium carbonate, bicarbonate, sesquicarbonate, sodium, lithium, or potassium hydroxide, or mixtures of the foregoing. Sodium hydroxide is preferred. The amount of alkaline source in the automatic dishwashing composition of the present invention (if any) is at least 1 wt % (preferably, at least 20 wt %) and up to 80 wt % (preferably, up to 60 wt %), based on the dry weight of the automatic dishwashing composition.

The selected automatic dishwashing composition of the present invention, optionally further comprises: a bleaching agent (e.g., sodium percarbonate). The amount of the bleaching agent in the automatic dishwashing composition of the present invention (if any) is preferably at a concentration of 1 to 25 wt % (more preferably, 5 to 20 wt %), based on the dry weight of the automatic dishwashing composition.

The selected automatic dishwashing composition of the present invention, optionally further comprises: a bleach activator (e.g., tetraacetylethylenediamine (TAED)). The amount of the bleach activator in the automatic dishwashing composition of the present invention (if any) is preferably at a concentration of 1 to 10 wt % (more preferably, 2.5 to 7.5 wt %), based on the dry weight of the automatic dishwashing composition.

Preferably, the selected automatic dishwashing composition of the present invention comprises ≤1 wt % (preferably, ≤0.5 wt %; more preferably, ≤0.2 wt %; still more preferably, ≤0.1 wt %; yet still more preferably, ≤0.01 wt %; most preferably, <the detectable limit), based on the dry weight of the automatic dishwashing composition, of phosphate (measured as elemental phosphorus). Preferably, the selected automatic dishwashing composition of the present invention is phosphate free.

Preferably, the selected automatic dishwashing composition of the present invention comprises ≤1 wt % (preferably, ≤0.5 wt %; more preferably, ≤0.2 wt %; still more preferably, ≤0.1 wt %; yet still more preferably, ≤0.01 wt %; most preferably, <the detectable limit), based on the dry weight of the automatic dishwashing composition, of builders selected from the group consisting of nitrilotriacetic acid; ethylenediaminetetraacetic acid; diethylenetriaminepentaacetic acid; glycine-N,N-diacetic acid; methyl glycine-N,N-diacetic acid; 2-hydroxyethyliminodiacetic acid; glutamic acid-N,N-diacetic acid; 3-hydroxy-2,2'-iminodissuccinate; S,S-ethylenediaminedisuccinate aspartic acid-diacetic acid; N,N'-ethylene diamine disuccinic acid; iminodisuccinic acid; aspartic acid; aspartic acid-N,N-diacetic acid; beta-alaninediacetic acid; polyaspartic acid; salts thereof and mixtures thereof. Most preferably, the automatic dishwashing composition of the present invention contains 0 wt % of builders selected from the group consisting of nitrilotriacetic acid; ethylenediaminetetraacetic acid; diethylenetriaminepentaacetic acid; glycine-N,N-diacetic acid; methyl glycine-N,N-diacetic acid; 2-hydroxyethyliminodiacetic acid; glutamic acid-N,N-diacetic acid; 3-hydroxy-2,2'-iminodissuccinate; S,S-ethylenediaminedisuccinate aspartic acid-diacetic acid; N,N'-ethylene diamine disuccinic acid; iminodisuccinic acid; aspartic acid; aspartic acid-N,N-diacetic acid; beta-alaninediacetic acid; polyaspartic acid; salts thereof and mixtures thereof.

Preferably, the selected automatic dishwashing composition of the present invention has a pH (at 1 wt % in water) of at least 7 (preferably, ≥9; more preferably, ≥9.5). Preferably, the automatic dishwashing composition of the present invention has a pH (at 1 wt % in water) of no greater than 13.

Preferably, the selected automatic dishwashing composition of the present invention can be formulated in any typical form, e.g., as a tablet, powder, block, monodose, sachet, paste, liquid or gel. The selected automatic dishwashing compositions of the present invention are useful for cleaning ware, such as eating and cooking utensils, dishes, in an automatic dishwashing machine.

Preferably, the selected automatic dishwashing composition of the present invention are suitable for use under typical operating conditions. For example, when used in an automatic dishwashing machine, typical water temperatures during the washing process preferably are from 20° C. to 85° C., preferably 30° C. to 70° C. Typical concentrations for the automatic dishwashing composition as a percentage of total liquid in the dishwasher preferably are from 0.1 to 1 wt %, preferably from 0.2 to 0.7 wt %. With selection of an appropriate product form and addition time, the automatic dishwashing compositions of the present invention may be present in the prewash, main wash, penultimate rinse, final rinse, or any combination of these cycles.

Some embodiments of the present invention will now be described in detail in the following Examples.

The weight average molecular weight, $M_W$; number average molecular weight, MN; and polydispersity (PDI) values reported in the Examples were measured by gel permeation chromatography (GPC) on an Agilent 1100 series LC system equipped with an Agilent 1100 series refractive index. Samples were dissolved in HPCL grade THF/FA mixture (100:5 volume/volume ratio) at a concentration of approximately 9 mg/mL and filtered through at 0.45 μm syringe filter before injection through a 4.6×10 mm Shodex KF guard column, a 8.0×300 mm Shodex KF 803 column, a 8.0×300 mm Shodex KF 802 column and a 8.0×100 mm Shodex KF-D column. A flow rate of 1 mL/min and temperature of 40° C. were maintained. The columns were calibrated with narrow molecular weight PS standards (EasiCal PS-2, Polymer Laboratories, Inc.).

Comparative Examples C1-C3 and Example 1: Dispersant Polymer Compositions

Dispersant polymer compositions used herein had the composition and weight average molecular weight as noted in TABLE 1.

TABLE 1

| | Monomer Feed composition (wt %) | | | |
|---|---|---|---|---|
| Example | Acrylic acid | Ethyl Acrylate | Butyl Acrylate | Weight average molecular weight |
| C1 | 95 | 5 | — | 10,761 Daltons |
| C2 | 95 | 5 | — | 21,497 Daltons |
| C3 | 90 | 10 | — | 10,706 Daltons |
| 1 | 80 | 20 | — | 9,398 Daltons |

Comparative Examples DC1-DC4 and Example Dl: Dishwashing Performance

Dishwashing compositions were prepared in each of Comparative Examples DC1-DC4 and Example Dl having the component formulations identified in TABLE 2. The protease used in each of the component formulations was Savinase® 12T protease available from Novozymes. The amylase used in each of the component formulations was Stainzyme® 12T amylase available from Novozymes.

TABLE 2

| | Concentration on solids basis (wt %) | | | | |
|---|---|---|---|---|---|
| Ingredient | DC1 | DC2 | DC3 | DC4 | D1 |
| Sodium Citrate | 30 | 30 | 30 | 30 | 30 |
| Sodium Carbonate | 25 | 25 | 25 | 25 | 25 |
| Sodium Percarbonate | 15 | 15 | 15 | 15 | 15 |
| TAED | 4 | 4 | 4 | 4 | 4 |
| Sodium Sulfate | 10 | 10 | 10 | 10 | 10 |
| Nonionic Surfactant[a] | 5 | 5 | 5 | 5 | 5 |
| HEDP[b] | 5 | 5 | 5 | 5 | 5 |
| Amylase | 1 | 1 | 1 | 1 | 1 |
| Protease | 2 | 2 | 2 | 2 | 2 |
| Dispersant polymer polyacrylic acid[c] | — | — | — | 3 | — |
| Dispersant Polymer Comp. Example C1 | 3 | — | — | — | — |
| Dispersant Polymer Comp. Example C2 | — | 3 | — | — | — |
| Dispersant Polymer Comp. Example C3 | — | — | 3 | — | — |
| Dispersant Polymer Example 1 | — | — | — | — | 3 |

[a]Dowfax ™ 20B102 nonionic linear alcohol alkoxylate available from The Dow Chemical Company.
[b]Dequest ™ 2016DG organophosphonate available from Italmatch Chemicals S.p.A.
[c]Acusol ™ 445N dispersant (polyacrylic acid polymer) available from The Dow Chemical Company.

Procedure for Preparing Food Soil

The ST1WA food soil described in TABLE 3 was prepared by the following procedure.

a) Bringing the water to a boil.
b) Mixing in a paper cup the instant gravy, the benzoic acid and the starch; and then adding the mixture to the boiling water.

c) Adding the milk and margarine to the product of (b).
d) Letting the product of (c) cool down to approximately 40° C., and then adding mixture to a kitchen mixer (Polytron).
e) Combining in another paper cup, the egg yolk, the ketchup and the mustard and mixing with a spoon.
f) Adding the product of (e) to the mixture of (d) in the blender with continuous stirring.
g) Letting the product of (f) stir in the blender for 5 minutes.
h) The freezing the product food soil mixture from (g).
i) 50 g of the frozen slush is placed into the dishwasher at beginning of the main wash.

TABLE 3

| Ingredient | wt % |
|---|---|
| Water | 70.9 |
| Margarine | 10.1 |
| Gravy Powder | 2.5 |
| Potato Starch | 0.5 |
| Benzoic Acid | 0.1 |
| Egg Yolk | 5.8 |
| Mustard | 2.5 |
| Ketchup | 2.5 |
| Milk | 5.1 |

Dishwashing Test Conditions

Machine: Miele SS-ADW, Model G1222SC Labor. Wash at 65° C.-30 min, prewash. Water: 37° fH hardness, Ca:Mg=3:1. Food soil: 50 g of the composition noted in TABLE 3 was introduced to the wash liquor frozen in a cup. Each dishwashing composition from Comparative Examples DC1-DC4 and Example Dl were tested, dosed at 20 g per wash.

Polystyrene Tumbler Filming and Spotting Evaluation

After 30 wash cycles under the above dishwashing test conditions, the polystyrene tumblers were dried in open air. After drying in open air, the polystyrene tumblers were observed in a light box with controlled illumination. The polystyrene tumblers were rated for filming and spotting according to ASTM method ranging from 1 (no film/spots) to 5 (heavily filmed/spotted). An average value of 1 to 5 for filming and spotting was determined as reported in TABLE 4.

TABLE 4

| | Thirty Cycle Score | |
|---|---|---|
| Composition | Filming | Spotting |
| Comp. Example DC1 | 5.0 | 2.6 |
| Comp. Example DC2 | 5.0 | 3.1 |
| Comp. Example DC3 | 5.0 | 3.1 |
| Comp. Example DC4 | 5.0 | 2.6 |
| Example D1 | 1.6 | 3.9 |

We claim:

1. A method of cleaning a plastic article in an automatic dishwashing machine, comprising:

selecting an automatic dishwashing composition for cleaning plastic, wherein the automatic dishwashing composition, consists of:

a builder, wherein the builder is a mixture of at least one carbonate and at least one citrate;
a phosphonate;
a nonionic surfactant;
a dispersant polymer which has:
(a) 75 to 81 wt % of structural units of formula I

I

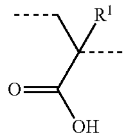

wherein each $R^1$ is independently selected from a hydrogen and a $—CH_3$ group and wherein $R^1$ is a hydrogen in 98 to 100 mol % of the structural units of formula I; and
(b) 19 to 25 wt % of structural units of formula II

II

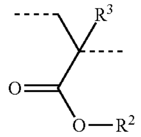

wherein each $R^2$ is independently selected from a $—C_{2-3}$ alkyl group and wherein $R^2$ is an ethyl group in 98 to 100 mol % of the structural units of formula II;
wherein each $R^3$ is independently selected from a hydrogen and a methyl group and wherein $R^3$ is a hydrogen in 98 to 100 mol % of the structural units of formula II; wherein the dispersant polymer has a weight average molecular weight of 1,750 to 17,500 Daltons; and wherein the dispersant polymer has less than or equal to 1 wt % of structural units of sulfonated monomer; and
optionally, an additive selected from the group consisting of a bleaching agent a bleach activator, a bleach catalyst; an enzyme, a filler, a fragrance, a dye, a foam suppressant and mixtures thereof; wherein the bleaching agent is selected from the group consisting of sodium percarbonate, sodium perborate and mixtures thereof; wherein the bleach activator is tetraacetylethylenediamine; wherein the bleach catalyst is selected from the group consisting of manganese (II) acetate, cobalt(II) chloride, bis(TACN)magnesium trioxide diacetate and mixtures thereof; wherein the enzyme is selected from the group consisting of protease, amylase, lipase, cellulase and mixtures thereof; and wherein the filler is selected from the group consisting of sodium sulfate, potassium sulfate, sodium chloride, potassium chloride and mixtures thereof;

providing a plastic article, wherein the plastic article comprises a polystyrene tumbler; and,
applying the automatic dishwashing composition to the plastic article.

2. The method of cleaning a plastic article of claim 1, wherein the dispersant polymer is selected to have a weight average molecular weight, $M_W$, of 1,900 to 14,250 Daltons.

3. The method of cleaning a plastic article of claim 1, wherein the automatic dishwashing composition is selected to consist of:

50 to 85 wt % of the builder;

0.75 to 7 wt % of the phosphonate;

1.5 to 7.5 wt % of the nonionic surfactant; and 2 to 6 wt % of the dispersant polymer; wherein the dispersant polymer has:

(a) 75 to 81 wt % of structural units of formula I

I

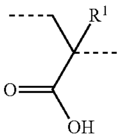

wherein each $R^1$ is a hydrogen; and (b) 19 to 25 wt % of structural units of formula II

II

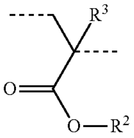

wherein each $R^2$ is an ethyl group and wherein each $R^3$ is a hydrogen; and wherein the dispersant polymer has a weight average molecular weight, $M_W$, of 1,900 to 14,250 Daltons; and optionally, an additive selected from the group consisting of a bleaching agent a bleach activator, a bleach catalyst; an enzyme, a filler, a fragrance, a dye, a foam suppressant and mixtures thereof; wherein the bleaching agent is selected from the group consisting of sodium percarbonate, sodium perborate and mixtures thereof; wherein the bleach activator is tetraacetylethylenediamine; wherein the bleach catalyst is selected from the group consisting of manganese(II) acetate, cobalt(II) chloride, bis(TACN)magnesium trioxide diacetate and mixtures thereof; wherein the enzyme is selected from the group consisting of protease, amylase, lipase cellulase and mixtures thereof; and wherein the filler is selected from the group consisting of sodium sulfate, potassium sulfate, sodium chloride, potassium chloride and mixtures thereof.

4. The method of cleaning a plastic article of claim 1, wherein the dispersant polymer consists of:

(a) 75 to 81 wt % of structural units of formula I, wherein each $R^1$ is independently selected from a hydrogen and a $-CH_3$ group and wherein $R^1$ is a hydrogen in 98 to 100 mol % of the structural units of formula I; and (b) 19 to 25 wt % of structural units of formula II, wherein each $R^2$ is independently selected from a $-C_{2-3}$ alkyl group and wherein $R^2$ is an ethyl group in 98 to 100 mol % of the structural units of formula II; wherein each $R^3$ is independently selected from a hydrogen and a methyl group and wherein $R^3$ is a hydrogen in 98 to 100 mol % of the structural units of formula II; wherein the dispersant polymer has a weight average molecular weight of 1,750 to 17,500 Daltons.

5. The method of cleaning a plastic article of claim 1, wherein the automatic dishwashing composition is selected to consist of:

50 to 85 wt % of the builder;

0.75 to 7 wt % of the phosphonate;

1.5 to 7.5 wt % of the nonionic surfactant; and 2 to 6 wt % of the dispersant polymer; wherein the dispersant polymer consists of:

(a) 75 to 81 wt % of structural units of formula I

I

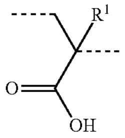

wherein each $R^1$ is a hydrogen; and (b) 19 to 25 wt % of structural units of formula II

II

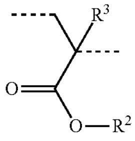

wherein each $R^2$ is an ethyl group and wherein each $R^3$ is a hydrogen; and wherein the dispersant polymer has a weight average molecular weight, $M_W$, of 1,900 to 14,250 Daltons; and optionally, an additive selected from the group consisting of a bleaching agent a bleach activator, a bleach catalyst; an enzyme, a filler, a fragrance, a dye, a foam suppressant and mixtures thereof; wherein the bleaching agent is selected from the group consisting of sodium percarbonate, sodium perborate and mixtures thereof; wherein the bleach activator is tetraacetylethylenediamine; wherein the bleach catalyst is selected from the group consisting of manganese(II) acetate, cobalt(II) chloride, bis(TACN)magnesium trioxide diacetate and mixtures thereof; wherein the enzyme is selected from the group consisting of protease, amylase, lipase, cellulase and mixtures thereof; and wherein the filler is selected from the group consisting of sodium sulfate, potassium sulfate, sodium chloride, potassium chloride and mixtures thereof.

* * * * *